(12) United States Patent
Sankoda

(10) Patent No.: US 11,151,319 B2
(45) Date of Patent: Oct. 19, 2021

(54) METHOD, PROGRAM, AND INFORMATION PROCESSING APPARATUS FOR PRESENTING CORRECTION CANDIDATES IN VOICE INPUT SYSTEM

(71) Applicant: FUJITSU LIMITED, Kawasaki (JP)

(72) Inventor: Satoru Sankoda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 165 days.

(21) Appl. No.: 16/541,280

(22) Filed: Aug. 15, 2019

(65) Prior Publication Data

US 2020/0104363 A1 Apr. 2, 2020

(30) Foreign Application Priority Data

Sep. 27, 2018 (JP) .............................. JP2018-182050

(51) Int. Cl.
*G06F 40/268* (2020.01)
*G10L 15/18* (2013.01)
(Continued)

(52) U.S. Cl.
CPC .......... *G06F 40/268* (2020.01); *G06F 3/0236* (2013.01); *G06F 3/0237* (2013.01);
(Continued)

(58) Field of Classification Search
CPC ......... G10L 15/04; G10L 15/05; G10L 15/18; G10L 15/22; G10L 2015/221;
(Continued)

(56) References Cited

U.S. PATENT DOCUMENTS 5,960,447 A 9/1999 Holt et al.
9,141,867 B1 * 9/2015 Matsuzuka ........... G06F 40/205
(Continued)

FOREIGN PATENT DOCUMENTS

JP 9-190436 7/1997
JP 2009-217665 9/2009
JP 2018-4947 1/2018

OTHER PUBLICATIONS

Google Patents translation of JP 2009-217665 (JP 2009-217665 submitted with IDS filed Aug. 15, 2019 and dated Sep. 24, 2009) (Year: 2009).*

(Continued)

*Primary Examiner* — Eric Yen
(74) *Attorney, Agent, or Firm* — Staas & Halsey, LLP

(57) ABSTRACT

A correction candidate presentation method performed by a computer for a voice input system is disclosed. The method includes: displaying, on a display screen, a plurality of word blocks generated by using morphological analysis from a character string obtained by speech recognition and keys each assigned to a corresponding one of the plurality of word blocks; accepting input of a first key of the keys that are displayed; identifying a first word block corresponding to the first key whose input has been accepted; and presenting, on the display screen, correction candidates of at least one word block among the identified first word block and a second word block including the first word block and a word block that is adjacent to the first word block.

13 Claims, 6 Drawing Sheets

(51) Int. Cl.
  *G10L 15/22* (2006.01)
  *G10L 15/05* (2013.01)
  *G06F 3/023* (2006.01)
  *G10L 15/26* (2006.01)
  *G06F 40/232* (2020.01)
  *G06F 3/0482* (2013.01)

(52) U.S. Cl.
  CPC ............ *G06F 40/232* (2020.01); *G10L 15/05* (2013.01); *G10L 15/18* (2013.01); *G10L 15/22* (2013.01); *G10L 15/26* (2013.01); *G06F 3/0482* (2013.01); *G10L 2015/221* (2013.01)

(58) Field of Classification Search
  CPC . G10L 2015/225; G10L 15/26; G06F 3/0233; G06F 3/0236; G06F 3/0237; G06F 40/232; G06F 40/268; G06F 3/0482
  See application file for complete search history.

(56) References Cited

U.S. PATENT DOCUMENTS

| | | | | |
|---|---|---|---|---|
| 2002/0091520 | A1* | 7/2002 | Endo | G10L 15/19 704/235 |
| 2005/0086057 | A1* | 4/2005 | Kosaka | G10L 15/193 704/251 |
| 2006/0173682 | A1* | 8/2006 | Manabe | G06F 16/3329 704/246 |
| 2007/0112764 | A1* | 5/2007 | Yih | G06F 40/169 |
| 2009/0187846 | A1* | 7/2009 | Paasovaara | G06F 3/0237 715/780 |
| 2009/0306980 | A1* | 12/2009 | Shin | G06F 3/0236 704/235 |
| 2010/0180198 | A1* | 7/2010 | Iakobashvili | G06F 40/232 715/257 |
| 2010/0286979 | A1* | 11/2010 | Zangvil | G06F 40/40 704/9 |
| 2011/0166851 | A1 | 7/2011 | LeBeau et al. | |
| 2011/0169731 | A1* | 7/2011 | Takenaka | G06F 3/0236 345/157 |
| 2011/0201387 | A1* | 8/2011 | Paek | G06F 40/274 455/566 |
| 2015/0127346 | A1 | 5/2015 | Gruenstein et al. | |
| 2018/0024731 | A1* | 1/2018 | Sanches | G06F 8/38 715/763 |
| 2018/0130459 | A1* | 5/2018 | Paradiso | G06T 13/00 |
| 2018/0158359 | A1* | 6/2018 | Quinlan | G09B 7/02 |

OTHER PUBLICATIONS

E. Paluka and C. Collins, "TandemTable: Supporting Conversations and Language Learning Using a Multi-Touch Digital Table," 2015, in Proceedings of the 2015 Graphics Interface Conference (GI '15), pp. 139-146. (Year: 2015).*

Extended European Search Report dated Mar. 19, 2020 from corresponding European Patent Application No. 19192559.3, 8 pages.

* cited by examiner

FIG. 4

PRONUNCIATION OF CHARACTER STRING
OBTAINED BY SPEECH RECOGNITION : 「しんだいじぷらんにんぐ」

⇅ COMPARE

PRONUNCIATION OF CHARACTER STRING
OBTAINED FROM MATERIALS : 「じんらいでぃーぷらーにんぐ」

35a 35b　35c　　35d

FOUR CHARACTERS TO BE CORRECTED

METHOD, PROGRAM, AND INFORMATION PROCESSING APPARATUS FOR PRESENTING CORRECTION CANDIDATES IN VOICE INPUT SYSTEM

CROSS-REFERENCE TO RELATED APPLICATION

This application is based upon and claims the benefit of priority of the prior Japanese Patent Application No. 2018-182050, filed on Sep. 27, 2018, the entire contents of which are incorporated herein by reference.

FIELD

The embodiment discussed herein is related to a method, a program, and an information processing apparatus for presenting correction candidates in a voice input system.

BACKGROUND

There is known a technique for inputting a character string by speech recognition using a computer. If a character string input by speech recognition contains erroneously recognized characters, the characters are to be manually corrected. It is also known that speech recognition software performs morphological analysis on a character string obtained by speech recognition to generate word blocks and corrects the word blocks by using a technique such as kana-kanji conversion.

Japanese Laid-open Patent Publication No. 2018-004947, Japanese Laid-open Patent Publication No. 9-190436, and Japanese Laid-open Patent Publication No. 2009-217665 are examples of related art.

However, word blocks generated by the speech recognition software are not necessarily correct in terms of division. Thus, a correction is sometimes made across adjacent word blocks. In the case where correction candidates are displayed in units of word blocks to present the correction candidates of a specific word block, confirmation and operation are performed for each of the adjacent word blocks. Thus, the number of items to be confirmed and the number of keystrokes increase when a character string is corrected.

In one aspect, an embodiment discussed herein provides a correction candidate presentation method, a correction candidate presentation program, and an information processing apparatus that successfully reduce the number of items to be confirmed and the number of keystrokes when a character string is corrected.

SUMMARY

According to an aspect of the embodiments, a correction candidate presentation method performed by a computer for a voice input system is disclosed. The method includes: displaying, on a display screen, a plurality of word blocks generated by using morphological analysis from a character string obtained by speech recognition and keys each assigned to a corresponding one of the plurality of word blocks; accepting input of a first key of the keys that are displayed; identifying a first word block corresponding to the first key whose input has been accepted; and presenting, on the display screen, correction candidates of at least one word block among the identified first word block and a second word block including the first word block and a word block that is adjacent to the first word block.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a correction candidate based on resemblance of a character string.

DESCRIPTION OF EMBODIMENTS

An embodiment of a correction candidate presentation method, a correction candidate presentation program, and an information processing apparatus disclosed herein will be described in detail below with reference to the accompanying drawings. Note that the disclosed technique is not limited to the embodiment. The following embodiment may be appropriately combined with another embodiment within a scope not causing a contradiction.

Figure 1:
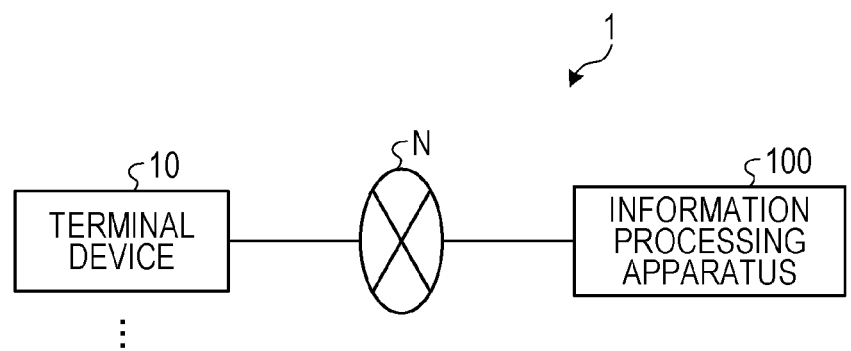
FIG. 1 is a block diagram illustrating an example of a configuration of an information processing system according to an embodiment.

FIG. 1 is a block diagram illustrating an example of a configuration of an information processing system according to an embodiment. An information processing system 1 illustrated in FIG. 1 includes a terminal device 10 and an information processing apparatus 100. The number of terminal devices 10 is not limited in the information processing system 1. The information processing system 1 may include a given number of terminal devices 10.

The terminal device 10 and the information processing apparatus 100 are coupled to each other via a network N to be able to communicate with each other. As the network N, any type of communication network such as a local area network (LAN) and a virtual private network (VPN) which may be wired or wireless as well as the Internet may be adopted. Communication performed via the network N may be encrypted by, for example, Transport Layer Security (TLS)/Secure Sockets Layer (SSL) or the like.

The information processing system 1 is an example of a system in which a material and audio data are transmitted from the terminal device 10 to the information processing apparatus 100 and a user edits, by using an editing screen provided by the information processing apparatus 100, sentence data generated by speech recognition.

The terminal device 10 is an information processing apparatus used by the user who edits the sentence data generated by speech recognition performed on the audio data. For example, various types of terminals such as a portable personal computer and a desktop personal computer are usable as the terminal device 10. The terminal device 10 transmits, to the information processing apparatus 100 via the network N, a material and audio data of a meeting for which the minutes are to be generated, for example. The terminal device 10 accepts editing of the sentence data generated by speech recognition and plays sound of an interval including a portion being edited, by using the editing screen provided by the information processing apparatus 100. At that time, the terminal device 10 sequentially transmits and receives editing information and audio data of the interval including the portion being edited to and from the information processing apparatus 100. In the case where the user starts editing the sentence data, the terminal device 10 transmits a start instruction to the information processing apparatus 100.

The information processing apparatus 100 is an information processing apparatus that provides the editing screen for accepting editing of the sentence data generated by speech recognition performed on the audio data received from the terminal device 10. The information processing apparatus 100 accepts input of a key assigned to each of a plurality of word blocks generated by using morphological analysis from a character string obtained by speech recognition.

A word block is a character string generated by using morphological analysis. Examples of a word block include a word block that is a morpheme and a word block that is a combination of a plurality of morphemes. The information processing apparatus 100 identifies a first word block corresponding to the key, input of which has been accepted. The information processing apparatus 100 presents correction candidates of at least one word block among the identified first word block and a second word block including the first word block and a word block that is immediately adjacent to the first word block. With this configuration, the information processing apparatus 100 may reduce the number of items to be confirmed and the number of keystrokes when a character string is corrected.

The information processing apparatus 100 arranges and displays a word block subjected to correction and confirmation in a central portion of a first area in which the plurality of word blocks generated by using morphological analysis from the character string obtained by speech recognition are displayed. The information processing apparatus 100 performs playback control on sound of an interval corresponding to the first area. With this configuration, the information processing apparatus 100 may play sound of word blocks preceding and following the word block subjected to correction and confirmation, without excess or deficiency.

Figure 2:
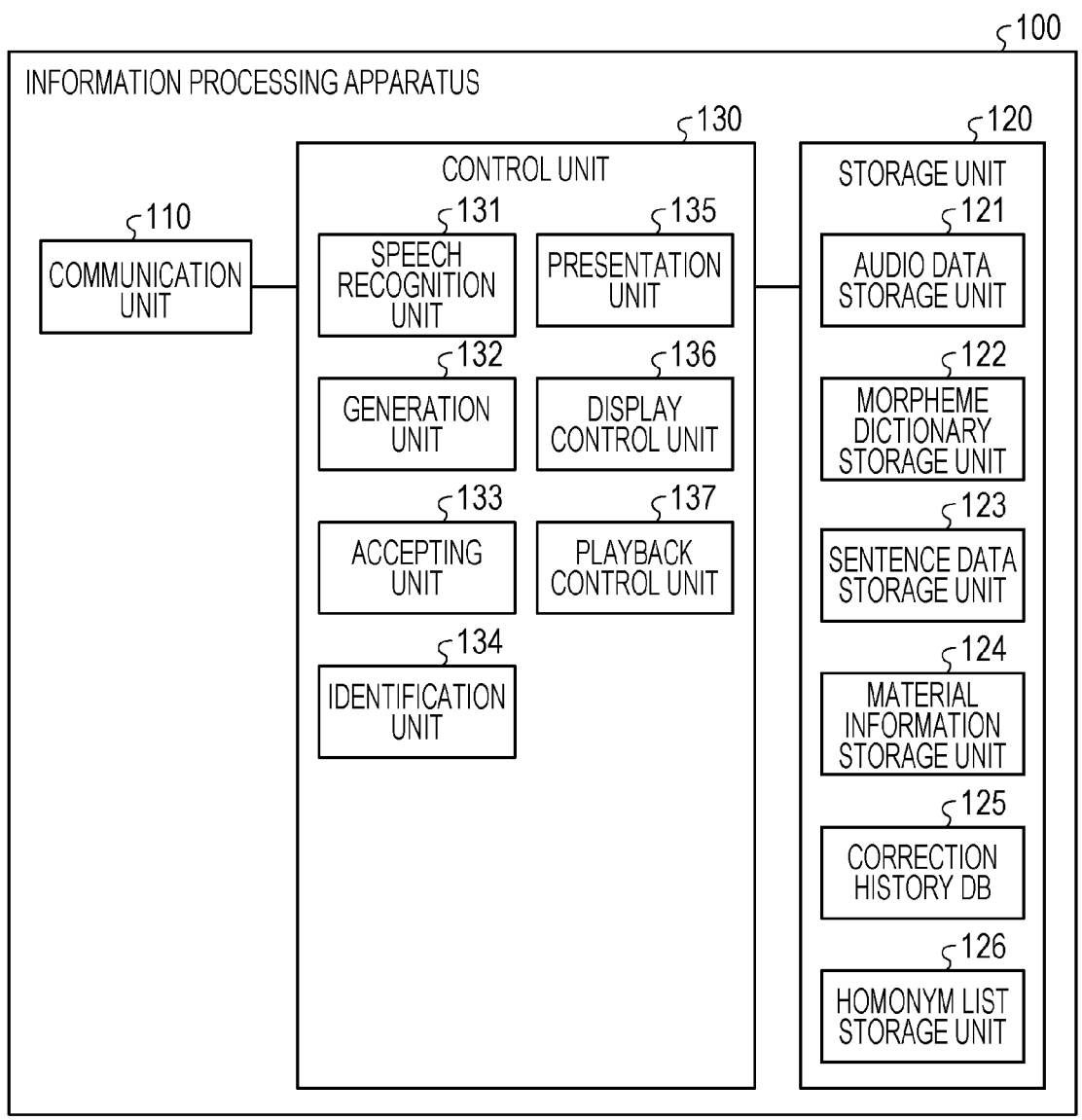
FIG. 2 is a block diagram illustrating an example of a configuration of an information processing apparatus according to the embodiment.

A configuration of the information processing apparatus 100 will be described next. FIG. 2 is a block diagram illustrating an example of the configuration of the information processing apparatus 100 according to the embodiment. As illustrated in FIG. 2, the information processing apparatus 100 includes a communication unit 110, a storage unit 120, and a control unit 130. The information processing apparatus 100 may include, in addition to the functional units illustrated in FIG. 2, various functional units which known computers include. For example, the information processing apparatus 100 may include functional units such as various types of input devices and audio output devices.

The communication unit 110 is implemented by, for example, a network interface card (NIC) or the like. The communication unit 110 is a communication interface that is coupled to the terminal device 10 via the network N in a wired or wireless manner and that controls communication of information performed between the information processing apparatus 100 and the terminal device 10. The communication unit 110 receives a material and audio data of a meeting and editing information from the terminal device 10. The communication unit 110 outputs the received material and audio data of the meeting and the received editing information to the control unit 130. The communication unit 110 also transmits, to the terminal device 10, editing screen data and audio data of an interval including a portion being edited that are input thereto from the control unit 130.

The storage unit 120 is implemented by, for example, a random access memory (RAM), a semiconductor memory element such as a flash memory, or a storage device such as a hard disk or an optical disc. The storage unit 120 includes an audio data storage unit 121, a morpheme dictionary storage unit 122, a sentence data storage unit 123, a material information storage unit 124, a correction history database (hereinafter abbreviated as DB) 125, and a homonym list storage unit 126. The storage unit 120 also stores information used in processing performed by the control unit 130.

The audio data storage unit 121 stores audio data received from the terminal device 10. The audio data is audio data that is recorded with an integrated circuit (IC) recorder or the like and is compressed by using various codecs such as MPEG-1 Audio Layer-3 (MP3) and Advanced Audio Coding (MC). The audio data storage unit 121 may store moving image data including moving images and audio of H. 264/MPEG-4 Advanced Video Coding (AVC) in a container such as MP4, for example.

The morpheme dictionary storage unit 122 stores a morpheme dictionary used when morphological analysis is performed on a character string obtained by speech recognition. The morpheme dictionary contains ordinary terms in advance. Examples of the ordinary terms include "computer" and "technology".

The sentence data storage unit 123 stores sentence data including a plurality of word blocks that are generated as a result of morphological analysis being performed on the character string obtained by speech recognition. In the case where speech recognition is performed by using a plurality of speech recognition engines, the sentence data storage unit 123 stores pieces of sentence data corresponding to the respective speech recognition engines. The sentence data storage unit 123 is updated based on selection of a correction candidate of a word block performed by a user and content of a correction input for the word block by the user.

The material information storage unit 124 stores materials or the like of a meeting received from the terminal device 10. The materials of the meeting are, for example, a document distributed at the meeting and a material displayed by using a projector or the like. These materials include, for example, sentences from which statements made at the meeting may be inferred. The material information storage unit 124 also stores a word list including pronunciations (phonemes) of words extracted from these materials.

The correction history DB 125 stores contents of corrections made for the sentence data in the past. The correction history DB 125 stores an original word block and a corrected word block in association with characters and phonemes, for example. Note that the material information storage unit 124 and the correction history DB 125 are an example of a dynamic dictionary whose content changes in accordance with a correction.

The homonym list storage unit 126 stores a list of homonyms. In the homonym list storage unit 126, for example, a plurality of words such as "移動" (meaning "movement" and pronounced as "idou"), "異動" (meaning "a personnel shift" and pronounced as "idou"), and "異同" (meaning "dissimilarity" and pronounced as "idou") are stored as homonyms in association with the pronunciation "いどう" (pronounced as "idou").

The control unit 130 is implemented as a result of a program stored in an internal storage device being executed by a central processing unit (CPU), a micro processing unit (MPU), or the like by using the RAM as a workspace, for example. The control unit 130 may also be implemented by an integrated circuit such as an application specific integrated circuit (ASIC) or a field programmable gate array (FPGA), for example.

The control unit 130 includes a speech recognition unit 131, a generation unit 132, an accepting unit 133, an identification unit 134, a presentation unit 135, a display control unit 136, and a playback control unit 137. The control unit 130 implements or performs information processing functions and operations described below. The internal configuration of the control unit 130 is not limited to the configuration illustrated in FIG. 2. The control unit 130 may have another configuration as long as the control unit 130 is configured to perform information processing described later.

The speech recognition unit 131 performs speech recognition on audio data stored in the audio data storage unit 121 to generate character string data. The speech recognition unit 131 has a plurality of speech recognition engines and generates character string data corresponding to each of the plurality of speech recognition engines. Various speech recognition engines such as the AmiVoice (registered trademark) engine, for example, may be used as the speech recognition engines. The speech recognition unit 131 may use, as a speech recognition engine, a server or the like that provides speech recognition application programming interfaces (APIs) via the communication unit 110 and the network N. The character string data includes, for each word (character string) obtained by speech recognition, start time, end time, a pronunciation, and a recognition result (including kanji, katakana, and the like), for example. The speech recognition unit 131 outputs the generated character string data to the generation unit 132.

Upon receiving the character string data input thereto from the speech recognition unit 131, the generation unit 132 performs morphological analysis on the character string data with reference to the morpheme dictionary storage unit 122 to generate sentence data including a plurality of word blocks. The sentence data includes, for each word block, start time, end time, a pronunciation, and a recognition result (including kanji, katakana, and the like) based on the character string data. The generation unit 132 stores the generated sentence data in the sentence data storage unit 123.

The accepting unit 133 receives a start instruction from the terminal device 10 via the network N and the communication unit 110. Upon receiving the start instruction, the accepting unit 133 outputs, to the display control unit 136, a generation instruction for generating an editing screen for editing the sentence data.

The accepting unit 133 accepts input of a key assigned to each of a plurality of word blocks displayed in the first area that is an area of the editing screen in which a correction may be made. The accepting unit 133 outputs information on the input key to the identification unit 134.

When the correction candidates of the first word block or the second word block are displayed on the editing screen, the accepting unit 133 accepts selection of a correction candidate. When these correction candidates are displayed, the accepting unit 133 may accept a correction of a character from the user. The accepting unit 133 updates the sentence data stored in the sentence data storage unit 123 based on the accepted correction candidate or the accepted correction content.

After updating the sentence data, the accepting unit 133 determines whether or not the first word block subjected to correction and confirmation or the second word block is the last word block of the sentence data. Upon determining that the first word block or the second word block is not the last word block, the accepting unit 133 continues to accept input of a key. If the accepting unit 133 determines that the first word block or the second word block is the last word block, a message or the like indicating that editing of the sentence data being edited is finished is displayed on the editing screen. The process then ends.

In other words, the accepting unit 133 accepts input of a key assigned to each of a plurality of word blocks generated by using morphological analysis from a character string obtained by speech recognition.

Upon receiving information on a key input thereto from the accepting unit 133, the identification unit 134 identifies the first word block corresponding to the key based on the information on the key. That is, the identification unit 134 identifies the word block subjected to correction and confirmation, for example. The identification unit 134 outputs the identified first word block to the presentation unit 135 and the display control unit 136.

Upon receiving the first word block input thereto from the identification unit 134, the presentation unit 135 generates, from sources, correction candidates of at least one word block among the first word block and the second word block. At that time, the presentation unit 135 refers to, as the sources, the sentence data storage unit 123, the material information storage unit 124, the correction history DB 125, and the homonym list storage unit 126. The second word block includes the first word block and a word block that is immediately adjacent to the first word block. That is, the second word block is a series of word blocks including the first word block and a word block immediately preceding or immediately following the first word block.

When generating the correction candidates, the presentation unit 135 uses, as the correction candidates, words having similar phonemes (pronunciations), based on the materials of the meeting and the word list that are stored in the material information storage unit 124, for example. When generating the correction candidates, the presentation unit 135 uses, as the correction candidates, at least one word among a word having matching characters and a word having a matching phoneme, based on contents of corrections made for the sentence data in the past and stored in the correction history DB 125, for example. When generating the correction candidates, the presentation unit 135 uses, as the correction candidates, words corresponding to the first word block or the second word block, based on pieces of sentence data recognized by the second and third speech recognition engines and stored in the sentence data storage unit 123, for example. When generating the correction candidates, the presentation unit 135 uses homonym words as the correction candidates, based on the homonym list stored in the homonym list storage unit 126, for example.

The presentation unit 135 determines the display order of the plurality of generated correction candidates such that the correction candidates are presented sequentially from a correction candidate whose character string corresponding to a pronunciation (phoneme) is most similar to a pronunciation of the at least one word block, for example. The presentation unit 135 may determine the display order of the plurality of generated correction candidates such that the correction candidates are presented sequentially from a correction candidate that is statistically ranked at the highest position, that is, a correction candidate that is most likely to be the correct answer, for example. For example, when the same correction candidate is generated from a plurality of sources among the plurality of generated correction candidates, the presentation unit 135 may display the correction candidate as being highly likely to be the correct answer at a higher position or may display the plurality of correction candidates using different colors based on the importance. The presentation unit 135 outputs the plurality of generated correction candidates and the determined display order to the display control unit 136.

Upon receiving a generation instruction input thereto from the accepting unit 133, the display control unit 136 generates the editing screen for editing the sentence data. The display control unit 136 transmits the generated editing screen as editing screen data to the terminal device 10 via the communication unit 110 and the network N. The display control unit 136 starts playing sound and displaying word blocks on the editing screen. At that time, the display control unit 136 sets a sound playback interval corresponding to the first word block to the last word block included in the first area and outputs the set sound playback interval to the playback control unit 137.

In addition, the display control unit 136 may display, in a second area different from the first area on the editing screen, a range broader than the word blocks displayed in the first area, that is, character strings included in temporarily preceding and following ranges, for example. That is, the character string displayed in the second area includes the word blocks displayed in the first area and word blocks preceding and following the word blocks included in the first area. Note that a word block that is not displayed in the first area may be displayed only partially, that is, as a character string, for example.

Upon receiving the first word block input thereto from the identification unit 134, the display control unit 136 moves each of the word blocks included in the first area such that the first word block is located in the central portion of the first area of the editing screen. The central portion indicates a portion including the center of the first area. By locating the first word block in the central portion of the first area of the editing screen, the first word block subjected to correction and confirmation and word blocks preceding and following the first word block may be displayed on the editing screen. The display control unit 136 updates the sound playback interval based on the word blocks included in the first area after the movement and outputs the updated sound playback interval to the playback control unit 137. That is, the display control unit 136 instructs the playback control unit 137 to play sound of the interval centered at the first word block subjected to correction and confirmation.

Upon receiving the plurality of correction candidates and the display order input thereto from the presentation unit 135, the display control unit 136 displays the plurality of correction candidates in the display order below the first word block or the second word block on the editing screen, for example. At that time, the display control unit 136 changes colors, color densities, or colors and color densities used to display the respective correction candidates in accordance with the probabilities of the individual correction candidates being the correct answer and the sources from which the respective correction candidates have been generated. The display control unit 136 displays the correction candidates generated from the identical source by using a common display mode, for example, by using the same display color.

When the correction candidates are presented, the display control unit 136 displays lines at respective boundaries of word blocks, for example, ahead and behind the first word block, ahead and behind the second word block, and between the word blocks such that which word block the correction candidates correspond to is distinguishable. At that time, the display control unit 136 draws, for example, frames surrounding the respective correction candidates up to the boundaries of the corresponding first or second word block.

If the accepting unit 133 accepts input of the next key after determining that the current word block is not the last word block, the display control unit 136 changes the first word block arranged in the central portion of the first area to the next first word block upon identification of the corresponding first word block.

In other words, the presentation unit 135 and the display control unit 136 present correction candidates of at least one word block among the identified first word block and the second word block including the first word block and a word block that is immediately adjacent to the first word block. The presentation unit 135 and the display control unit 136 present the correction candidates based on a pronunciation of the first word block or the second word block. The presentation unit 135 and the display control unit 136 generate the correction candidates from a plurality of sources which are sources from which the correction candidates are retrieved. The presentation unit 135 and the display control unit 136 change display modes of the respective correction candidates in accordance with probabilities of the individual correction candidates being the correct answer.

The presentation unit 135 and the display control unit 136 present the correction candidates sequentially from a correction candidate whose character string corresponding to a pronunciation is most similar to a pronunciation of the at least one word block. The presentation unit 135 and the display control unit 136 change colors, color densities, or colors and color densities used to display the respective correction candidates. The presentation unit 135 and the display control unit 136 use a common display mode for correction candidates generated from an identical type of source among the correction candidates. The presentation unit 135 and the display control unit 136 present the correction candidates such that which of the first word block and the second word block the correction candidates correspond to is distinguishable. The presentation unit 135 and the display control unit 136 display a line at each boundary of the first word block or the second word block. The second word block includes a word block immediately preceding or immediately following the first word block.

The display control unit 136 moves and displays, in a first area where a plurality of word blocks each assigned a key are displayed, the plurality of word blocks such that the first word block subjected to correction and confirmation is displayed in the central portion of the first area. The display control unit 136 updates the word blocks displayed in the first area in response to identification of the first word block. The display control unit 136 displays, in a second area different from the first area, a character string obtained by speech recognition for a range broader than the plurality of word blocks displayed in the first area.

The display control unit 136 arranges and displays the word block subjected to correction and confirmation in the central portion of the first area where the plurality of word blocks generated by using morphological analysis from a character string obtained by speech recognition are displayed. The display control unit 136 changes the word block arranged in the central portion of the first area to the next word block in response to an operation of confirming the word block subjected to correction and confirmation. The display control unit 136 displays, in the second area different from the first area, a character string obtained by speech recognition for a range broader than the plurality of word blocks displayed in the first area.

Upon receiving the sound playback interval input thereto from the display control unit 136, the playback control unit 137 transmits audio data of the audio playback interval, that is, an interval including a portion being edited, to the terminal device 10 via the communication unit 110 and the network N with reference to the audio data storage unit 121. At that time, the playback control unit 137 performs control such that audio data of the sound playback interval centered at the first word block (the interval including the portion being edited) is repeatedly played. The playback control unit 137 may accept a specified interval in an interval corresponding to the second area of the editing screen and may transmit audio data of the accepted specified interval to the terminal device 10 via the communication unit 110 and the network N. Upon receiving a new sound playback interval input thereto while sound of a certain sound playback interval is being played, the playback control unit 137 performs control such that sound of the new sound playback interval is played from the beginning after the sound of the sound playback interval that is being played is played until the end.

In other words, the playback control unit 137 performs playback control on sound of an interval corresponding to the first area. The playback control unit 137 performs playback control on sound of the interval corresponding to the first area in which the resultant word block after the change is located in the central portion. The playback control unit 137 accepts a specified interval in an interval corresponding to the second area and performs playback control on sound of the accepted specified interval. The playback control unit 137 repeatedly plays sound of the interval or the specified interval in the playback control.

Figure 3:
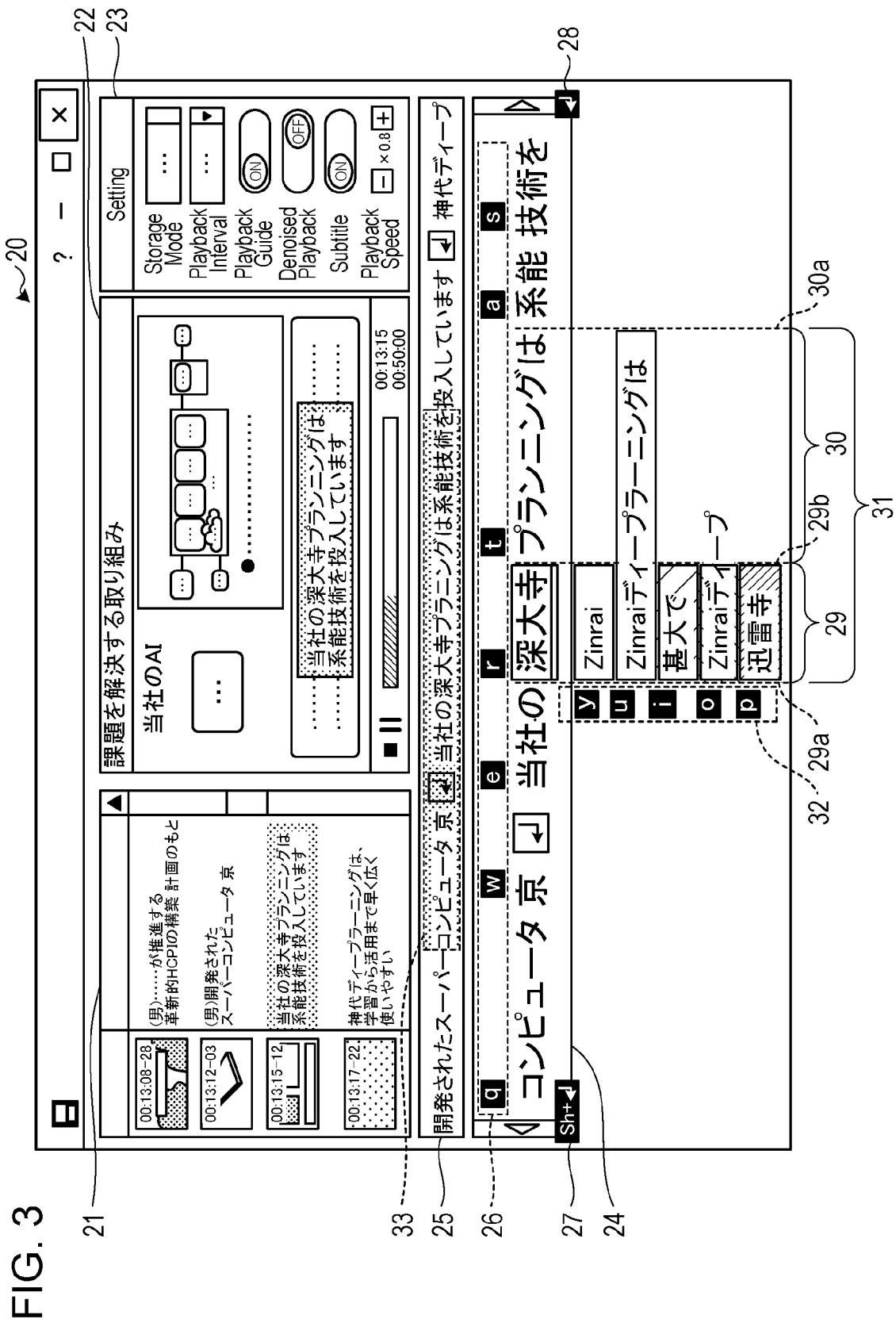
FIG. 3 is a diagram illustrating an example of an editing screen.

The editing screen will now be described with reference to FIG. 3. FIG. 3 is a diagram illustrating an example of the editing screen. An editing screen 20 illustrated in FIG. 3 includes an area 21, an area 22, and an area 23. In the area 21, sentence data is displayed in association with an interval of sound or the like. In the area 22, a material and sentence data corresponding to a portion being edited are displayed. In the area 23, various settings are displayed. At the top of the area 22, a title of a document being edited, which is "課題を解決する取り組み (meaning Approaches to solve the problem)", is displayed. The editing screen 20 also includes a first area 24 and a second area 25. The first area 24 is an area in which sentence data is correctable. The second area 25 is an area in which a character string of a range broader than the word blocks displayed in the first area is displayed. In the second area 25, a range 33 corresponding to the word blocks being displayed in the first area 24 is displayed in a manner distinguishable from other portions. For example, the range 33 is displayed with hatching or the like. The range 33 is changeable by, for example, a drag operation or the like. The changing of the range 33 is also reflected in the word blocks displayed in the first area 24.

In the first area 24, word blocks and a shortcut key group 26 for the word blocks are displayed. In the first area 24, shortcut keys 27 and 28 for moving the word blocks displayed in the first area 24 back and forth by a half are displayed. In the central portion of the first area 24, a first word block 29 ("深大寺" (meaning "Jindai-temple" and pronounced as "jindai-ji" in FIG. 3) subjected to correction and confirmation is displayed in a manner distinguishable from the other word blocks. In the example of FIG. 3, a series of word blocks including a word block 30 ("プランニングは" (meaning "planning is" and pronounced as "puranningu wa") in FIG. 3) that immediately follows the first word block 29 is set as a second word block 31 ("深大寺プランニングは" (meaning "Jindai-temple planning is" and pronounced as "jindai-ji puranningu wa") in FIG. 3). Lines 29a and 29b are drawn at respective boundaries located ahead and behind the first word block 29. A line 30a is drawn at a boundary located behind the second word block 31, that is, at a boundary located behind of the word block 30. On the editing screen 20, sound of an interval corresponding to the first area 24 is repeatedly played.

Correction candidates of the first word block 29 or the second word block 31 are displayed below the first area 24 in response to input of a key corresponding to the first word block 29. The correction candidates are displayed in the vicinity of the first word block 29 displayed in the first area 24 sequentially from a correction candidate having the most similar pronunciation, for example. For each of the correction candidates, for example, a frame surrounding the correction candidate is drawn up to the line 29b or 30a. The correction candidates are displayed to have different display colors, different color densities, different types of hatching, or the like based on the sources from which the respective correction candidates have been generated. The correction candidates are selectable by using a corresponding shortcut key group 32. In the example of FIG. 3, when a user inputs a key "r", "深大寺" (meaning "Jindai-temple and pronounced as "jindai-ji") is arranged as the first word block 29 in the central portion of the first area 24. In the example of FIG. 3, correction candidates of the first word block 29 or the second word block 31 are displayed below the first word block 29 or the second word block 31. For example, a first correction candidate "Zinrai" is a correction candidate of the first word block 29. A second correction candidate "Zinrai ディープラーニングは" (meaning "Zinrai deep learning is" and pronounced as "zinrai dhiipu raaningu wa") is a correction candidate of the second word block 31.

The user inputs a key "u" to select the second correction candidate "Zinrai ディープラーニングは" (meaning "Zinrai deep learning is" and pronounced as "zinrai dhiipu raaningu wa") which is the correct answer from among the correction candidates of the first word block 29 subjected to correction and confirmation and the second word block 31 including the following word block. The corresponding word blocks "深大寺" (meaning "Jindai-temple" and pronounced as "jindai-ji") and "プランニングは" (meaning "planning is" and pronounced as "puranningu wa") of the sentence data are updated to the selected correction candidate "Zinrai ディープラーニングは" (meaning "Zinrai deep learning is" and pronounced as "zinrai dhiipu raaningu wa"). In this way, the information processing apparatus 100 may reduce the number of items to be confirmed and the number of keystrokes when a character string is corrected. The information processing apparatus 100 repeatedly plays sound of an interval centered at the word block subjected to correction and confirmation. This frees the user from an operation of a media player and consequently allows the user to concentrate on the keyboard operation. The information processing apparatus 100 may play sound of the sound playback interval before and after the word block subjected to correction and confirmation, without excess or deficiency. The information processing apparatus 100 is capable of presenting correction candidates for a combination of adjacent word blocks. Thus, the information processing apparatus 100 may cope with various speech recognition errors. The information processing apparatus 100 may suppress an unintentional correction that occurs due to misrecognition of the correction range.

A correction candidate that is presented will be described next with reference to FIG. 4. FIG. 4 is a diagram illustrating an example of a correction candidate based on resemblance of a character string. As illustrated in FIG. 4, suppose that a character string obtained by speech recognition is pronounced as "しんだいじぷらん にんぐ" (pronounced as shi-n-da-i-ji-pu-ra-n-ni-n-gu). Also suppose that a character string obtained from a material is "じんらいでぃーぷ らーにんぐ" (pronounced as "zi-n-ra-i-dhii-pu-raa-ni-n-gu"). In such a case, the presentation unit 135 compares this character string with the character string obtained by speech recognition and determines that four characters are to be corrected as indicated by characters 35a to 35d. As a result of the determination, the presentation unit 135 generates correction candidates such that a higher priority is given for a character string with a less number of characters to be corrected, that is, a character string having a higher character similarity, for example. That is, the presentation unit 135 preferentially presents correction candidates that are more likely to be the correct answer.

Figure 5:
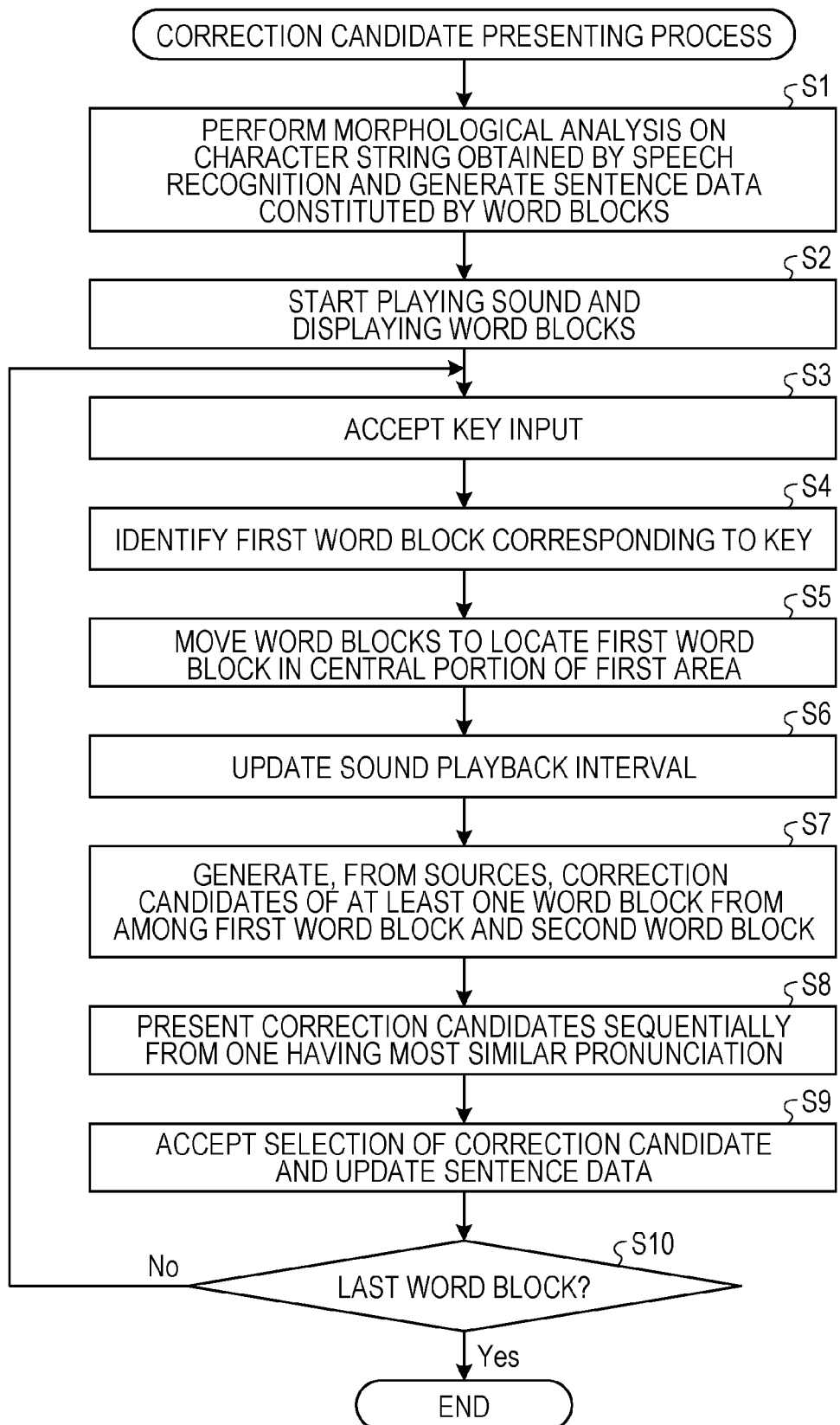
FIG. 5 is a flowchart illustrating an example of a correction candidate presentation process according to the embodiment.

An operation performed by the information processing apparatus 100 according to the embodiment will be described next. FIG. 5 is a flowchart illustrating an example of a correction candidate presentation process according to the embodiment.

The speech recognition unit 131 performs speech recognition on audio data stored in the audio data storage unit 121 to generate character string data. The speech recognition unit 131 outputs the generated character string data to the generation unit 132. The generation unit 132 performs morphological analysis on the character string data input thereto from the speech recognition unit 131 with reference to the morpheme dictionary storage unit 122 to generate sentence data obtained by dividing the character string data into word blocks (step S1). The generation unit 132 stores the generated sentence data in the sentence data storage unit 123.

Upon receiving a start instruction from the terminal device 10, the accepting unit 133 outputs to the display control unit 136 a generation instruction for generating an editing screen for editing the sentence data. Upon receiving the generation instruction input thereto from the accepting unit 133, the display control unit 136 generates the editing screen for editing the sentence data. The display control unit 136 transmits the generated editing screen as editing screen data to the terminal device 10 to cause the terminal device 10 to display the editing screen. The display control unit 136 starts playing sound and displaying word blocks on the editing screen (step S2).

The accepting unit 133 accepts input of a key assigned to each of the plurality of word blocks displayed in the first area of the editing screen (step S3). The accepting unit 133 outputs information on the input key to the identification unit 134. Upon receiving the information on the key input thereto from the accepting unit 133, the identification unit 134 identifies the first word block corresponding to the key (step S4). The identification unit 134 outputs the identified first word block to the presentation unit 135 and the display control unit 136.

Upon receiving the first word block input thereto from the identification unit 134, the display control unit 136 moves each of the word blocks displayed in the first area such that the first word block is located in the central portion of the first area of the editing screen (step S5). The display control unit 136 updates the sound playback interval based on the word blocks included in the first area after the movement and outputs the updated sound playback interval to the playback control unit 137 (step S6). Upon receiving the sound playback interval input thereto from the display control unit 136, the playback control unit 137 transmits audio data of the sound playback interval subjected to playback control to the terminal device 10 with reference to the audio data storage unit 121.

Upon receiving the first word block input thereto from the identification unit 134, the presentation unit 135 generates, from sources, correction candidates of at least one word block among the first word block and the second word block (step S7). The presentation unit 135 determines the display order of the generated correction candidates such that the correction candidates are presented sequentially from a correction candidate having the most similar pronunciation, for example. The presentation unit 135 outputs the plurality of generated correction candidates and the determined display order to the display control unit 136.

Upon receiving the plurality of correction candidates and the display order input thereto from the presentation unit 135, the display control unit 136 displays the plurality of correction candidates in the display order below the first word block or the second word block on the editing screen, for example. That is, the display control unit 136 presents the correction candidates sequentially from a correction candidate having the most similar pronunciation (step S8).

The accepting unit 133 accepts selection of a correction candidate on the editing screen. The accepting unit 133 updates the sentence data stored in the sentence data storage unit 123 based on the accepted correction candidate (step S9). After updating the sentence data, the accepting unit 133 determines whether or not the first word block subjected to correction and confirmation or the second word block is the last word block of the sentence data (step S10). If the accepting unit 133 determines that the first word block subjected to correction and confirmation or the second word block is not the last word block (step S10: No), the process returns to step S3 in which the accepting unit 133 continues to accept input of a key.

If the accepting unit 133 determines that the first word block subjected to correction and confirmation or the second word block is the last word block (step S10: Yes), a message indicating that editing of the sentence data being edited is finished is displayed on the editing screen. The correction candidate presentation process then ends. With this configuration, the information processing apparatus 100 may reduce the number of items to be confirmed and the number of keystrokes when a character string is corrected. The information processing apparatus 100 may also reduce the work time for creating text from a moving image or sound. The information processing apparatus 100 may play sound of word blocks preceding and following the word block subjected to correction and confirmation, without excess or deficiency.

As described above, the information processing apparatus 100 accepts input of a key assigned to each of a plurality of word blocks generated by using morphological analysis from a character string obtained by speech recognition. The information processing apparatus 100 identifies a first word block corresponding to the key, input of which has been accepted. The information processing apparatus 100 presents correction candidates of at least one word block among the identified first word block and a second word block including the first word block and a word block that is immediately adjacent to the first word block. Consequently, the information processing apparatus 100 may reduce the number of items to be confirmed and the number of keystrokes when a character string is corrected.

The information processing apparatus 100 presents the correction candidates based on a pronunciation of the first word block or the second word block. Consequently, the information processing apparatus 100 may present correction candidates across a plurality of word blocks.

The information processing apparatus 100 generates the correction candidates from a plurality of sources which are sources from which the correction candidates are retrieved. Consequently, the information processing apparatus 100 may present many types of correction candidates.

The information processing apparatus 100 changes the display modes of the respective correction candidates in accordance with probabilities of the individual correction candidates being the correct answer. Consequently, the information processing apparatus 100 may preferentially present correction candidates that are more likely to be the correct answer.

The information processing apparatus 100 presents the correction candidates sequentially from a correction candidate whose character string corresponding to a pronunciation is most similar to a pronunciation of the at least one word block. Consequently, the information processing apparatus 100 may preferentially present correction candidates that are more likely to be the correct answer.

The information processing apparatus 100 changes colors, color densities, or colors and color densities used to display the respective correction candidates. Consequently, the information processing apparatus 100 may present correction candidates in accordance with probabilities of the individual correction candidates being the correct answer or the sources from which the respective correction candidates have been retrieved.

The information processing apparatus 100 uses a common display mode for correction candidates generated from an identical type of source among the correction candidates. Consequently, the information processing apparatus 100 may present correction candidates in accordance with sources from which the respective correction candidates have been retrieved.

The information processing apparatus 100 presents the correction candidates such that which of the first word block and the second word block the correction candidates correspond to is distinguishable. Consequently, the information processing apparatus 100 may explicitly indicate the word block to be corrected based on the correction candidates.

The information processing apparatus 100 displays a line at each boundary of the first word block or the second word block. Consequently, the information processing apparatus 100 may explicitly indicate the word block to be corrected based on the correction candidates.

In the information processing apparatus 100, the second word block includes a word block immediately preceding or immediately following the first word block. Consequently, the information processing apparatus 100 may present correction candidates across immediately adjacent word blocks.

The information processing apparatus 100 moves and displays, in a first area where a plurality of word blocks each assigned a key are displayed, the plurality of word blocks such that the first word block subjected to correction and confirmation is displayed in a central portion of the first area. Consequently, the information processing apparatus 100 may display the word block subjected to correction and confirmation in the central portion of the first area.

The information processing apparatus 100 updates the word blocks displayed in the first area in response to the identifying of the first word block. Consequently, the information processing apparatus 100 may display word blocks located in the vicinity of the word block subjected to correction and confirmation to allow a user to easily grasp the context of the word block subjected to correction and confirmation.

The information processing apparatus 100 displays, in a second area different from the first area, a character string obtained by speech recognition for a range broader than the plurality of word blocks displayed in the first area. Consequently, the information processing apparatus 100 may display word blocks located in the vicinity of the word block subjected to correction and confirmation to allow a user to more easily grasp the context of the word block subjected to correction and confirmation.

In the embodiment described above, the editing screen is displayed on the terminal device 10 coupled to the information processing apparatus 100 via the network N. However, the configuration is not limited this one. For example, the information processing apparatus 100 may include a display unit and an operation unit. The information processing apparatus 100 may display the editing screen and accept input from a user.

The components of the respective units illustrated in the drawings do not necessarily have to be physically configured as illustrated. That is, for example, specific forms of dispersion and integration of the units are not limited to those illustrated in the drawings, and all or part thereof may be configured by being functionally or physically dispersed or integrated in given units according to various loads, the state of use, and the like. For example, the presentation unit 135 and the display control unit 136 of the information processing apparatus 100 may be integrated. Further, the order of processing illustrated in the drawings is not limited to the order described above. The processing may be simultaneously performed or the order may be switched within the range in which the processing contents do not contradict with one another.

Furthermore, all or given some of various processing functions executed in each apparatus may be executed by a CPU (or microcomputer such as an MPU or a micro controller unit (MCU)). Needless to say, all or given some of the various processing functions may be executed with a program analyzed and executed by a CPU (or a microcomputer such as an MPU or an MCU) or with hardware using wired logic.

Figure 6:
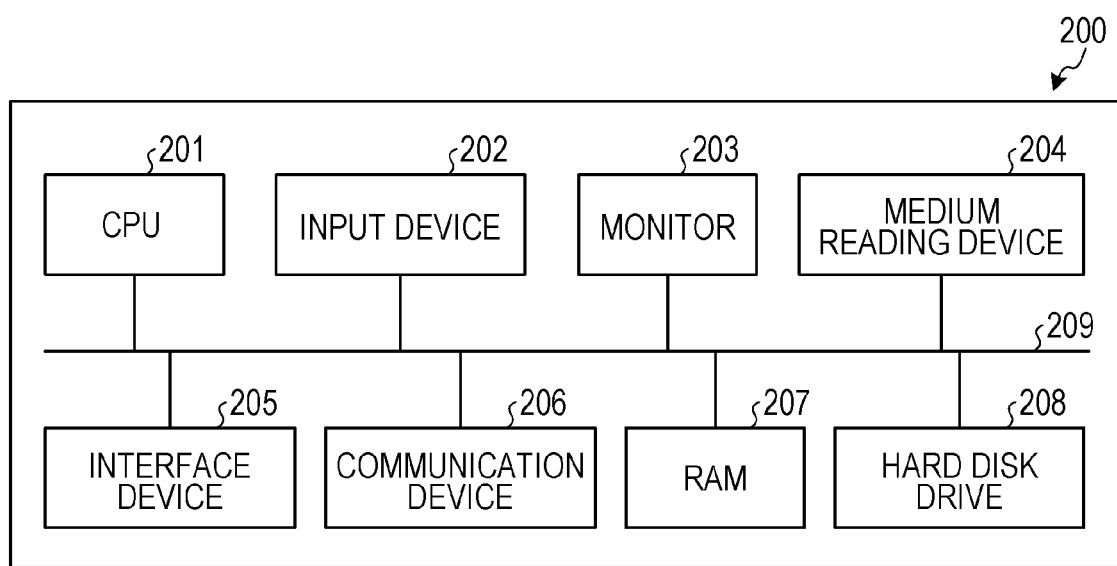
FIG. 6 is a diagram illustrating an example of a computer that executes a correction candidate presentation program.

The various kinds of processing described in the above-described embodiment may be implemented as a result of a computer executing a prepared program. Accordingly, an example of a computer that executes a program implementing functions that are substantially the same as those of the above-described embodiment will be described below. FIG. 6 is a diagram illustrating an example of a computer that executes a correction candidate presentation program.

As illustrated in FIG. 6, a computer 200 includes a CPU 201, an input device 202, and a monitor 203. The CPU 201 performs various kinds of arithmetic processing. The input device 202 accepts input of data. The computer 200 also includes a medium reading device 204, an interface device 205, and a communication device 206. The medium reading device 204 reads a program or the like from a storage medium. The interface device 205 enables the computer 200 to be coupled to various apparatuses. The communication device 206 enables the computer 200 to be coupled to the terminal device 10, another information processing apparatus, or the like in a wired or wireless manner. The computer 200 also includes a RAM 207 that temporarily stores various kinds of information and a hard disk drive 208. The CPU 201, the input device 202, the monitor 203, the medium reading device 204, the interface device 205, the communication device 206, the RAM 207, and the hard disk drive 208 are coupled to a bus 209.

The hard disk drive 208 stores the correction candidate presentation program that implements functions that are substantially the same as those of the processing units including the speech recognition unit 131, the generation unit 132, the accepting unit 133, the identification unit 134, the presentation unit 135, the display control unit 136, and the playback control unit 137 illustrated in FIG. 2. The hard disk drive 208 stores the audio data storage unit 121, the morpheme dictionary storage unit 122, the sentence data storage unit 123, and the material information storage unit 124. The hard disk drive 208 also stores the correction history DB 125, the homonym list storage unit 126, and various kinds of data for implementing the correction candidate presentation program. The input device 202 accepts input of various kinds of information such as operation information from an administrator of the computer 200, for example. The monitor 203 displays various screens such as a display screen for the administrator of the computer 200, for example. The interface device 205 is coupled to a printer or the like, for example. The communication device 206 has a function that is substantially the same as that of the communication unit 110 illustrated in FIG. 2, for example. The communication device 206 is coupled to the network N and exchanges various kinds of information with the terminal device 10 and another information processing apparatus.

The CPU 201 reads programs stored in the hard disk drive 208, loads the programs to the RAM 207, and executes the programs to perform various kinds of processing. These programs cause the computer 200 to function as the speech recognition unit 131, the generation unit 132, the accepting unit 133, the identification unit 134, the presentation unit 135, the display control unit 136, and the playback control unit 137 illustrated in FIG. 2.

Note that the above-described correction candidate presentation program does not necessarily have to be stored in the hard disk drive 208. For example, the computer 200 may read and execute the program stored on a storage medium that is readable by the computer 200. The storage medium that is readable by the computer 200 may be, for example, a portable recording medium such as a compact disc read-only memory (CD-ROM), a digital versatile disc (DVD), or a Universal Serial Bus (USB) memory; a semiconductor memory such as a flash memory; a hard disk drive; or the like. The correction candidate presentation program may be stored in an apparatus coupled to a public line, the Internet, a LAN, or the like. The computer 200 may read the correction candidate presentation program from the apparatus and execute the correction candidate presentation program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A correction candidate presentation method performed by a computer, the method comprising:
    displaying, on a display screen, a plurality of word blocks generated by using morphological analysis from a character string obtained by speech recognition and keys each assigned to a corresponding one of the plurality of word blocks;
    accepting input of a first key of the keys that are displayed;
    identifying a first word block corresponding to the first key whose input has been accepted; and
    presenting, on the display screen, a plurality of correction candidates including first word block correction candidates for the identified first word block and second word block correction candidates for a second word block including the first word block and a word block that is adjacent to the first word block, wherein the plurality of correction candidates are presented such that which of the first word block and the second word block the plurality of correction candidates correspond to, is distinguishable.

2. The correction candidate presentation method according to claim 1, wherein
    in the presenting, the plurality of correction candidates are presented based on a pronunciation of the first word block or a pronunciation of the second word block.

3. The correction candidate presentation method according to claim 1, wherein
    in the presenting, the plurality of correction candidates are generated from a plurality of different sources which are sources from which the plurality of correction candidates are retrieved.

4. The correction candidate presentation method according to claim 3, wherein
    in the presenting, a common display mode is used for correction candidates generated from a same source among the plurality of correction candidates.

5. The correction candidate presentation method according to claim 1, wherein
    in the presenting, display modes of the plurality of correction candidates are changed in accordance with probabilities of the plurality of correction candidates being a correct answer.

6. The correction candidate presentation method according to claim 5, wherein
    in the presenting, the plurality of correction candidates are presented sequentially from a correction candidate whose character string is most similar to a character string corresponding to a pronunciation of the first word block or a pronunciation of the second word block.

7. The correction candidate presentation method according to claim 5, wherein in the presenting, colors, color densities, or colors and color densities used to display the plurality of correction candidates, are changed for respective ones of the plurality of correction candidates.

8. The correction candidate presentation method according to claim 1, wherein
in the presenting, a line is displayed at each boundary of the first word block or the second word block.

9. The correction candidate presentation method according to claim 1, wherein
in the displaying, in a first area where the plurality of word blocks and the keys are displayed, the plurality of word blocks are moved and displayed such that the first word block is displayed in a central portion of the first area.

10. The correction candidate presentation method according to claim 9, wherein
in the displaying, the plurality of word blocks that are displayed in the first area are updated in response to the identifying of the first word block.

11. The correction candidate presentation method according to claim 9, wherein
in the displaying, a character string obtained by speech recognition for a range broader than the plurality of word blocks displayed in the first area is displayed in a second area different from the first area on the display screen.

12. A non-transitory computer-readable storage medium having stored a correction candidate presentation program which when executed causes a computer to perform a process comprising:
displaying, on a display screen, a plurality of word blocks generated by using morphological analysis from a character string obtained by speech recognition and keys each assigned to a corresponding one of the plurality of word blocks;
accepting input of a first key of the keys that are displayed;
identifying a first word block corresponding to the first key whose input has been accepted; and
presenting, on the display screen, a plurality of correction candidates including first word block correction candidates for the identified first word block and second word block correction candidates for a second word block including the first word block and a word block that is adjacent to the first word block, wherein the plurality of correction candidates are presented such that which of the first word block and the second word block the plurality of correction candidates correspond to, is distinguishable.

13. An information processing apparatus comprising:
a memory; and
a processor coupled to the memory and configured to perform a process including:
displaying, on a display screen, a plurality of word blocks generated by using morphological analysis from a character string obtained by speech recognition and keys each assigned to a corresponding one of the plurality of word blocks;
accepting input of a first key of the keys that are displayed;
identifying a first word block corresponding to the first key whose input has been accepted; and
presenting, on the display screen, a plurality of correction candidates including first word block correction candidates for the identified first word block and second word block correction candidates for a second word block including the first word block and a word block that is adjacent to the first word block, wherein the plurality of correction candidates are presented such that which of the first word block and the second word block the plurality of correction candidates correspond to, is distinguishable.

* * * * *